June 23, 1964 C. E. ROESSLER, JR 3,138,754
PRINTED CIRCUIT FORMULA CARD SYSTEMS AND THEIR COMPONENTS
Filed June 9, 1958 3 Sheets-Sheet 1

INVENTOR
Charles E. Roessler, Jr.
BY
Frank H. Borden
ATTORNEY

INVENTOR
Charles E. Roessler, Jr.
BY Frank H. Borden
ATTORNEY

June 23, 1964  C. E. ROESSLER, JR  3,138,754
PRINTED CIRCUIT FORMULA CARD SYSTEMS AND THEIR COMPONENTS
Filed June 9, 1958  3 Sheets-Sheet 3

Fig. 2a.

INVENTOR
Charles E. Roessler, Jr.
BY
Frank H. Borden
ATTORNEY

3,138,754
PRINTED CIRCUIT FORMULA CARD SYSTEMS AND THEIR COMPONENTS

Charles E. Roessler, Jr., Rutland, Vt., assignor to Howe Richardson Scale Company, a corporation of Delaware
Filed June 9, 1958, Ser. No. 740,969
15 Claims. (Cl. 323—96)

This invention relates to printed circuit formula card systems and their components. It has particular reference to a network incorporating a bank of resistances, with means, controlled by an associated removable printed card, for coupling selected resistances in appropriate series order in two complemental circuits to simulate the relation of resistances on each side of the slider arm of an adjustable potentiometer, in a control circuit containing such simulation.

There are many situations in industry in which it is desired at a predetermined interval to start an operation or first work step, to maintain the operation until completion, and utilize the conclusion of the first step, to initiate and consumate a second work step or operation. This is desired for instance in machine tool operation, where the components of the machine tool combination are required to bring successive boring, milling, grinding, and like steps or operations to bear successively on common work.

In the construction of such machine tool combination there is, or will be provided, a movable member positionable in space with the progress of the operating steps. This member may comprise a device movable as a direct incident of the work steps, such as in response to the movement of drill heads, or the like, but for illustrative purposes may be considered to comprise some form of cam. The illustrative cam progresses from one setting to another functionally with the progress of each of the successive work steps or operations. It is desired to have a control system functioning with progress of the cam or the like to automatically control the initiation, progress and termination of each step or operation and the initiation of the next succeeding step or operation.

A purely illustrative application of the instant invention is in the art of automatic batching, wherein it is desired to successively weigh predetermined weights of respective ingredients, of a formula-related series of plural ingredients of a common batch, in which the common movable member may comprise an angularly movable member in the head of a dial scale, the positioning of which is proportional to weight applied to the scale.

For purposes of illustration of the invention reference may be made to U.S. application of William D. Macgeorge, Serial No. 657,639 filed May 7, 1957, and now Patent No. 2,934,751. The invention of said application is, illustratively, concerned with automatic batching of plural ingredients, by which the respective plural ingredients are successively weighed according to a preselected formula. In one form or another a feature of the invention of the said Macgeorge application is the provision of a transducer having a movable element, the position of which is functional with the condition of an associated variable, movable proportionally to changes of such condition, and which transducer produces a signal variable in amplitude linearly with changes in condition of such variable. Illustratively, and preferably the transducer is comprised of a differential transformer and the condition change-following movable element thereof is an armature or core, the position of which determines the signal emitted by the secondary windings of the transformer. In the basic circuit of said application, a potentiometer is provided as a variable voltage divider, to balance against the voltage of the differential transformer. With the voltage output from the differential transformer at the inception of a control function known, the potentiometer is set so that it is initially out of balance thereof by a predetermined value. As the condition of the variable changes the position of the armature changes, and thus the output from the secondaries of the transformer changes, and at a predetermined secondaries output point the circuit is balanced. The transition from unbalanced to balanced circuit has been accompanied by a predetermined change in condition of the variable and the position of the armature. Illustratively, balance of the circuit indicates the attainment of a predetermined weight on the scale, and the completion of a work step or operation.

This unbalance-to-balance step represents the situation in any circuit joining the potentiometer with the secondaries of the differential transformer, whether in a voltage bridge, in a Wheatstone bridge, or with no bridge at all.

With this basic organization the length of required travel of the armature of the signalling differential transformer for one control response is predetermined, and is variable with pre-setting of the potentiometer. This will account for the performance of the first step in any machine tool organization, or the weighing of the first ingredient in a batching control system.

It being recognized that machine tool operations are sequential in a plurality of steps, just as, in batching by weight, there are succeeding ingredients to be weighed, the systems associate a second preset potentiometer with the same signalling differential transformer, and by a stepping switch, or the like switch means the first potentiometer is moved out of the circuit with the secondaries of the signalling transformer, usually with the then existent output of the secondaries as a datum, and which instantaneously is out of balance with the second potentiometer. This unbalance is utilized by changing the condition of the variable to effect a secondary motion of the armature of the differential transformer, representative of the length of travel of a control member associated with the second step of the machine tool operation, or of the addition of a predetermined weight on the weighing scale, and so on, through "$n$" circuits utilizing "$n$" potentiometers.

There is a further important facility available from this type of circuitry of particular value to the instant invention. This pertains to machine tool operations, but finds a perfect exemplification in batching by weight. This recognizes that there may be a more or less large number of diverse formula which may be desired to be switched into or out of circuit with the instant signalling transformer. To this end, as illustrated in said patent, groups of variously pre-set potentiometers are utilized as storage of the respective proportionate ingredients of the respective formulae. After such pre-setting, each formula is stored in the panel of the apparatus, being called into use by suitable switching when desired.

While this storage system of multiple formulas as disclosed in said patent, is thoroughly operative and useful, it is relatively expensive, in the provision of the plurality of precision potentiometers for each formula group, which are expensive items, and additionally require such panel space as to become impractical when more than a few such preset formula groups are to be established and stored for such ultimate use as the given situations may require.

It is among the objects of the invention: to provide a network including a bank of resistors with means for selectively placing certain of the resistors in a circuit to provide a circuit of predetermined resistance; to provide a network including a single bank of resistors with plural means for selectively placing groups of selected resistors successively in the same circuit; to improve printed card circuits; to provide a network including contacts and means responsive to energization of respective contacts for selectively placing resistances in a circuit, and printed card means movable relative to said contacts to effect said selection; to provide in electrical circuitry a simulation of a variable potentiometer; to provide circuit means simulative of a potentiometer and a variable slider thereon, with means for simulating the resistances of such potentiometer on both sides of such slider; to provide means including movable printed circuit cards for effecting sequential operating steps in a predetermined series by selectively introducing said cards into a normally static network; to provide a control system incorporating removable printed circuit cards, and relays controlled by the circuits established by said cards, with the relays controlling the selective placement of various resistances in circuits, in which any incidental variations in contact resistance between the cards and the circuits established by the cards is nullified in the selection and bringing into the circuit the respective resistances.

In the accompanying drawings, forming part of this description:

FIG. 1 represents a schematic diagram of a common signalling differential transformer, and a plurality of potentiometers for successively controlling the operation of a relay for actuating stepping switches, and controlling the variation of condition of the variable associated with the differential transformer, according to one form of the invention shown in said application.

FIGS. 2 and 2a represent together a schematic diagram of the circuitry by which by insertable and removable printed circuit cards, respectively storing predetermined data, the organization of a potentiometer as disclosed in FIG. 1 can be simulated, in each of an illustrative seven different but successive simulations, each representing a stage of operation or the weighing of a specific ingredient of a batching organization, in which the output leads A and B represent and simulate the extreme ends of a potentiometer, and output lead C represents and simulates the position of a slider arm with reference to the respective extremes A and B. These related figures of which FIG. 2 represents left hand portion of the network and FIG. 2a represents right hand portion of the network hereinafter collectively designated as FIG. 2, for convenience.

Figure 1:
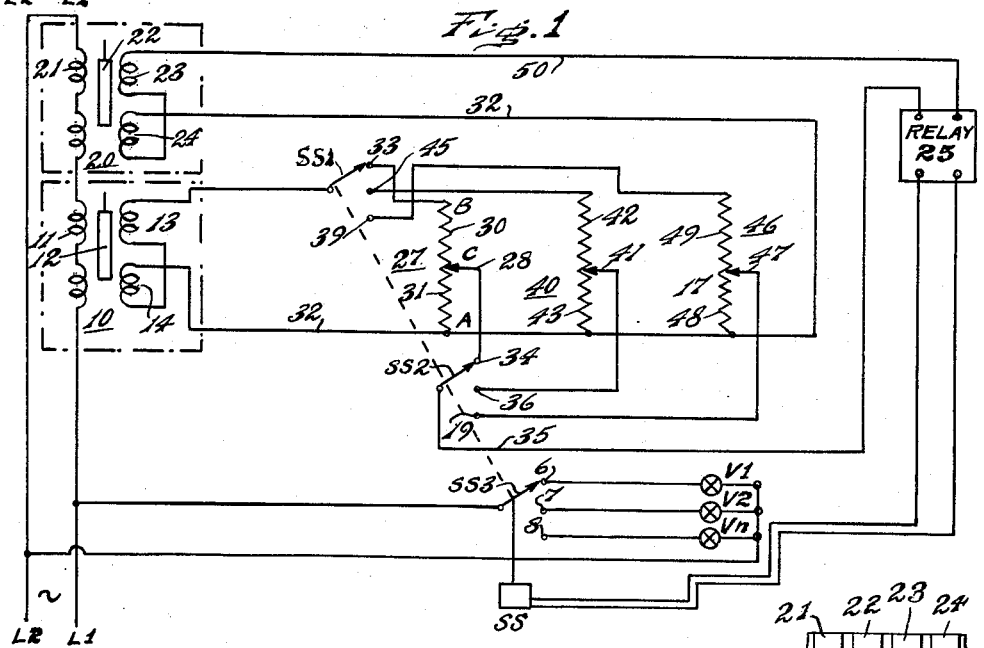

To illustrate generally the background circuitry of the system, reference may be made to FIG. 1, which illustrates a system by means of which the output of a common transducer can be bucked successively against each of a plurality of variable potentiometers, (comprising FIG. 2 of said application), to effect successive work steps or operations in a given sequence thereof. In this illustrative instance, a range coil differential transformer 10 is provided, comprising an energizing primary winding 11, a manually adjustable and settable armature or core 12, and a pair of secondary windings 13 and 14. The organization of the range coil (as with the signalling transformer 20, to be described) is such that the output of the secondary winding is effectively a function of bucking voltages in the secondary coils, as taught for instance in the U.S. patent to William D. Macgeorge No. 2,640,967 issued June 2, 1953. As illustrated, for convenience, the secondaries 13 and 14 are shown in bucking series relation. A signalling differential transformer 20 is provided, comprising a primary winding 21, a movable armature 22, positionable proportionally to changes in condition of an associated variable, to be described, and a secondary winding comprising secondary coils 23 and 24 in effectively bucking series relation.

A relay 25 is provided, one input to which is a series connection 50 at one end of the signalling secondaries 23 and 24, with the other end of the latter in series connection to one output lead of the secondary coils 13 and 14, by a connector 32, connected across the lower ends of each of the potentiometers 27, 40 and 46. The latter may represent potentiometer "$n$." The other output lead of the range coil secondaries 13 and 14 connects to the movable switch element SS1 of a stepping switch SS, moving selectively across fixed contacts 33, 45 and 39. The said fixed contacts are respectively connected to the upper ends of the respective potentiometers 27, 40 and 46.

The respective manually adjustable sliders 28, 41 and 47 of the respective potentiometers 27, 40 and 46, are connected to the respective fixed contacts 34, 36 and 19 for selective engagement by a movable stepping switch element SS2, also connected to and operated by a stepping switch SS, and thereby connected to relay 25 by connector 35 joined to the switch element SS2. Illustratively a plurality of electro magnetic valves V1, V2 and V$n$ are provided which may be actuated and deactuated in sequence by direct operations of relay 25, but which are illustratively controlled by stepping switch element SS3, sweeping contacts 6, 7 and 8 of the respective valve circuit. Stepping switch SS is controlled by relay 25.

It will be understood that with the parts disclosed, with the respective switches on the fixed contacts as shown, with the range coil armature displaced from its null output position, a voltage of given phase and of suitable amplitude is impressed across the wire of the potentiometer 27, between a lower point A and an upper point B, thereof. The potentiometer slider 28 contacts the wire 27 at a variable point C. Assume that each of the potentiometers 27, 40 and 46 is a high precision potentiometer having an illustrative total resistance of 200 ohms. The resistance between A and C is complemental to the resistance between C and B, in establishing the total resistance of said 200 ohms.

Assume that the movable element controlling the position of armature 22 of the signalling transformer 20 is a device having an illustrative 1000 units of linear or angular movement from one extreme setting to its other extreme setting, and during the transition between limits plural successive work steps are to be accomplished. It will be seen that with reference to any potentiometer of 200 ohms, the respective graduations of the movable element, normally 1000 in number, represent 0.2 ohm. If, for example the system is designed for batching by weight, and the scale has a total capacity of 1000 lbs., and is graduated into 1000 units, each graduation of the scale represents 1 lb. and can be represented by a resistance of 0.2 ohm.

Assuming illustratively that the system is designed for batching by weight, in FIG. 1, the setting of the slider 28 on wire 27 establishes a resistance between A and C of a value representing the initial unbalance to be overcome or neutralized by movement of the armature 22, to represent the weight to be attained on the scale by the operation of the system, while the resistance between C and B, represents the weight between that which has been preselected by the setting of the potentiometer as a cut off point, and the remainder of the scale to its maximum capacity. With each potentiometer of the series of the illustrative 200 ohms of resistance, it will be seen that with the point C coincident with point A, there is no resistance between A and C, representative of no weight on the scale, whereas there is the full 200 ohms between point C and point B. Conversely with point C coincident with point B there is a full 200 ohms of resistance between A and C, representative of 1000 pounds of weight on the scale. With the slider 28 centered on wire 27, resistance between A and C is 100 ohms, and also the resistance between C and B is 100 ohms, and the scale is set for 500 pounds to be applied to the scale to cutoff.

It will be seen that with sufficient numbers of resistances in a network, and of predetermined and respectively different ohmic characteristics, a predetermined circuit can be created representing a desired resistance between points A and C, and another complemental circuit can be created representing the complemental resistance between points C and B, with the desired total resistance of 200 ohms between A and B, and thereby the potentiometers per se can be eliminated, as these are simulated in the network. It will also be evident that with such a network, and with the ohmic characteristics of the respective resistances carefully selected, coding of the resistance circuits can be effected in multiples of 0.2 ohm. Finally it will be clear that with such network printed card devices can be inserted and withdrawn in effecting the predetermined resistance circuits.

Figure 2:
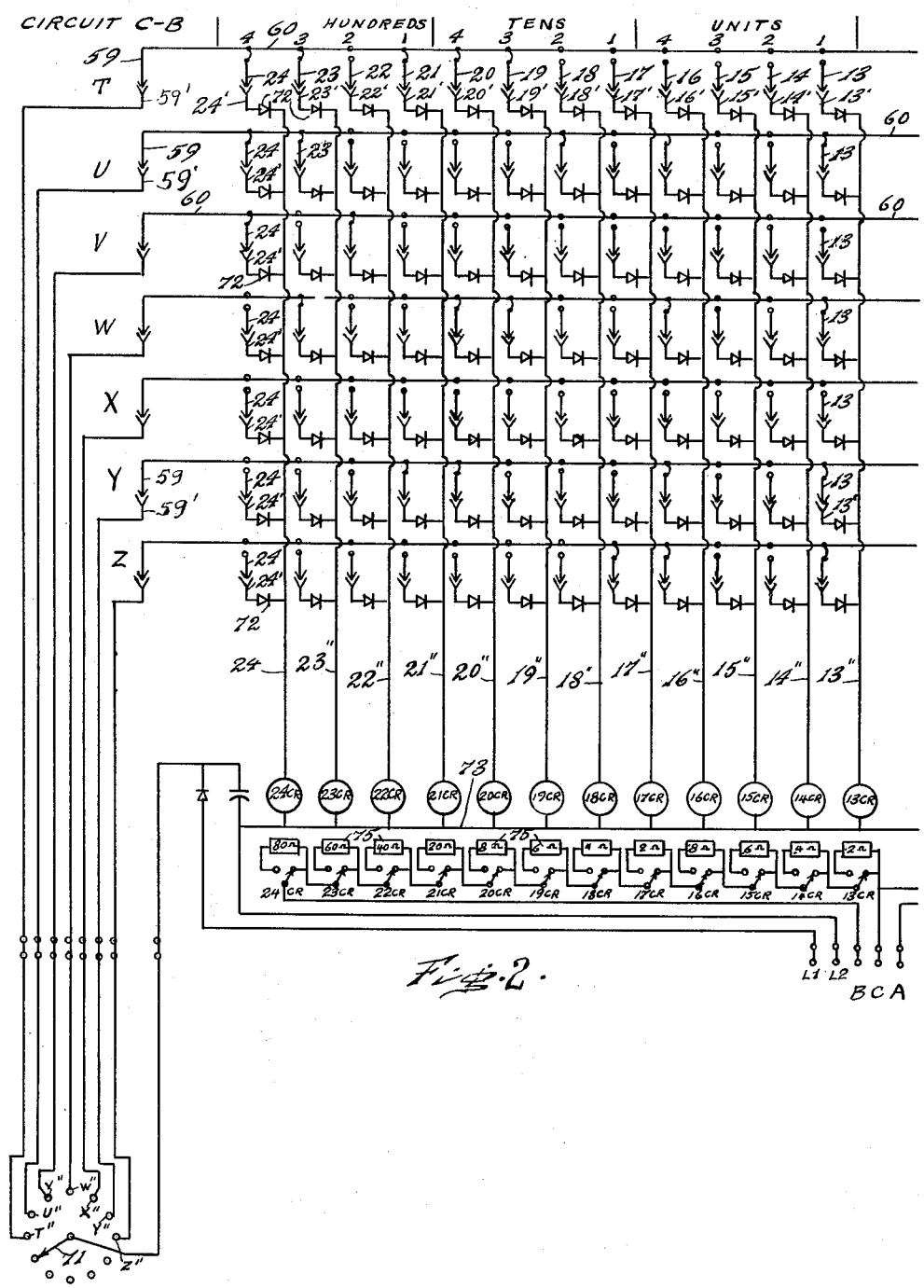

Referring to FIG. 2 a network is provided as two complemental halves, for convenience, with the left hand side comprising the C–B resistance circuits, and the right hand side comprising the A–C resistance circuits. The schematic diagram disclosed in FIG. 2 is outlined with reference to a purely illustrative coding organization and related to the dial chart graduations and their incremental ohmic characteristics, by which selected values of resistance are placed in series to establish, on the right side, illustratively, the selected total resistance A–C, and on the left side of the diagram, illustratively, the selected total complemental resistance C–B, to establish the total resistance A–B of the illustrative 200 ohms. The respective resistance values are selected by a coded printed circuit card, to be described, and are established by selected relays respectively controlling specific resistances in the selected circuits, to be described. It will be understood that in the illustrative case of batching by weight, the resistance value established in resistance A–C, represents the number of dial graduations between the instantaneous datum of the scale and the "cutoff" of the ingredient supply, which may be designated as the "desired" weight, whereas the resistance value established by the resistance C–B represents the number of chart graduations between cutoff and the full scale.

The network is divided into twenty-four main circuit divisions, comprising two groups of twelve on each side of center, each main circuit extending vertically of the network in horizontal spacing, and is comprised of an illustrative seven stages or operation controls, each common to the respective main circuit divisions. As indicated by legends on the diagram the respective sets of twelve main circuits are divided into three groups of four circuits each numbered from the left, successively as "4," "3," "2" and "1" for the respective hundreds (H), tens (T) and units (U) of digits.

If greater range or accuracy is desired, additional main circuits can be provided, also divided into "4," "3," "2," and "1" of thousand units, or of .1 units, and the like.

It will be recognized that selected combinations of digits from the numbers 1, 2, 3 and 4 can produce any desired digital number from 1 to 10, and, with no digit used in the combination of a given group, a zero is indicated.

Thus with the grouping shown for measurements from zero to 10 account can be taken of the digital factors, or lack of factors, in the complete combination of hundreds, tens and units digits according to the sub division of movement of the movable element of the apparatus.

Figure 3:
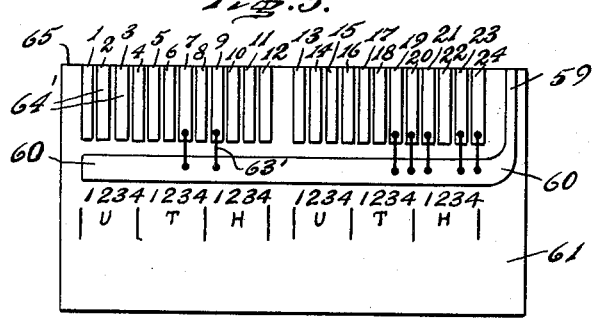
FIG. 3 represents a plan of an illustrative printed circuit card, as used with any one of the seven stages shown in FIG. 2.
Figure 4:
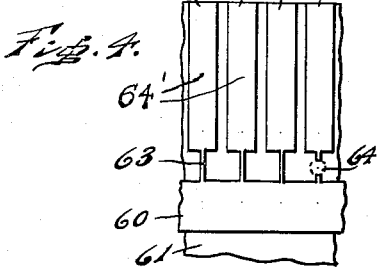
FIG. 4 represents a fragmentary plan of a modification of the card of FIG. 3.

As the network is inert and incomplete without the printed cards for selecting the circuits, before describing the circuitry of FIG. 2, reference may be made to the disclosure of FIGS. 3 and 4, showing illustrative printed cards 61 for selected operative association with the network.

The illustrative card 61, of insulating material, bears printed conductors 64' on one surface, respectively extending to a forward edge 65 of the card, comprising a plurality of terminals or contacts in two groups, each of an illustrative twelve parallel spaced contacts extending normal to said edge 65. These are identified in a first group from the right of the card as shown in FIGS. 3 and 4, as contacts 24, to 13, inclusive. The contacts of the second group numbered from the center of the card toward the left, are contacts 12 to 1 inclusive. The card 61 also bears a printed common connector 60, extending across the card in juxtaposition to the inner ends of both groups of contacts 24 to 1 inclusive and terminating in a contact extension 59 parallel to but spaced from the number 24 contact of the right hand group. While, as shown in FIG. 3, all contacts 64 are initially isolated from each other and from common connector 60, and the selected contacts only are joined to the common contact 60, by soldered conenctions 63', in coding the card. It is preferred however, to have the respective contacts 24 to 1 inclusive initially all print-connected to the common lead or connection 60, by integral necks 63, of reduced thickness or width, in the card fragment comprising FIG. 4. In this latter case to code the card the un-selected contacts are disconnected from the common return 60 by drilling, punching, or the like, to form connection-disrupting apertures 64 through the respective necks of the contacts which are to be put out of action on the instant card. While not essential it is usual to have apertures 64 pass entirely through the card. This form of card organization is not only cheaper, but by providing apertures in a given pattern in a given card it affords means by which the respective cards can be sorted and applied. More importantly it avoids the variation in resistance between selected contacts and the common return incident to soldering connections.

As a convenience in preselecting the contacts to be connected to the common return when the given card is completed in its selected contact organization, a chart is provided for alignment with the groups of contacts or terminals 64', comprised on the left side of symbols and digits relating to the stage of operation, such illustratively as Weight, and Ingredient number, with divisions from the left, of number "1," "2," "3" and "4" of "U" or "units," divisions "1," "2," "3" and "4," of "T" or "Tens," and divisions "1," "2," "3" and "4" of "H" or "Hundreds." A similar complemental division is made on the chart for the right side of the card. For ultimate convenience in handling the cards and making the contact selection it is preferred to place the chart on the card itself. It will be observed that the respective numerals of the groups are respectively aligned with the respective appropriate contacts 64'. Thus for instance, on the left of the card, U 1, 2, 3, and 4, are respectively aligned with contacts 1, 2, 3, and 4 and on the right with contacts 13, 14, 15 and 16 respectively, T 1, 2, 3 and 4 on the left are respectively aligned with contacts 5, 6, 7, and 8 respectively, and on the right with contacts 17, 18, 19, and 20, respectively, H 1, 2, 3, and 4 are respectively aligned on the left with contacts 9, 10, 11, and 12 respectively, and on the right side with contacts 21, 22, 23 and 24, respectively.

It will be understood that each card 61 is inverted from its position shown in FIG. 3 when it is inserted into circuit-controlling relation to the stationary network. Therefore the contacts at the left in FIG. 3, interengage with contacts (to be described) on the right of the network in FIG. 2. Similarly the contacts at the right of FIG. 3 interengage the contacts on the left of the network.

The contacts on the card 61 will be so selectively connected to the common return thereof as to energize certain selected main circuits only in the network. The main circuits energize relays when the circuit is made, as will be explained, and the relays respectively bring selected resistors into a series circuit, and thus the cards control the resistances in the circuit A–C on the right hand side of the network, and the complemental resistances in the circuit C–B, with the resistances in circuits A–C and C–B totaling a resistance A–B, equaling the predetermined total resistance of the potentiometer which is being simulated, which as noted in the illustrative case, is the said 200 ohms.

Referring to the network shown in FIG. 2, plural stages are disclosed, representative of and controlling respective steps, operations, or ingredients, respectively indicated from the top as horizontal rows "T," "U," "V," "W," "X," "Y" and "Z." The network organization shown, purely schematically, in FIG. 2, is divided into two halves, reversed in organization from that of the card in its association with the network. The edge 65 of the card becomes the leading edge thereof and it enters a general jack-type connector in each stage, which holds it while making firm contacts, and from which engagement it can be manually withdrawn.

The respective stages T to Z inclusive, (and as many more or less as may be found desirable) of the circuitry of FIG. 2, are each divided horizontally into the illustrative twenty five vertically disposed fixed contacts 24' to 1', inclusive, and 59', complemental to, and of similar spacing and general dimensions to the card mounted contacts, and with suitable biased backing devices (not shown) as to force the card contacts respectively into firm rigid intimate association with the respective juxtaposed network contacts of the given stage, when the card is manually inserted therein. In FIG. 2 the engagement of the card-mounted contacts with the network-disposed contacts is indicated by the double Vs between them. As noted the circuit fixed contacts are numbered from the left in the diagram as 24' to 1', inclusive, with contact 59' adjacent contact 1'. Circuit contacts 59' of each stage from T to Z are each connected respectively to one fixed terminal or contact "T," "U," "V," "W," "X," "Y," or "Z" of a stepping switch SS4, the movable switch element 71 of which may be moved manually if desired, and also is progressed by stepping switch SS, or the like controlled by operations of relay 25. In the network each fixed contact 24' to 1', respectively leads through a diode 72 to a main common circuit line associated with the same contact in all of the stages. In other words circuit lines 24" to 1", inclusive connect respectively to fixed contacts 24' to 1', and each is common to all of the similarly numbered contacts in all of the stages, from T to Z inclusive. There are thus in the two halves of the circuitry of FIG. 2, two sets of 12 main circuit lines, to wit, 24" to 13", inclusive on the left, and 12" to 1" inclusive, on the right.

The stepping switch SS4 is used to successively couple a given respective stage into operation in the circuitry, while holding all other stages out of operation therewith.

The network is supplied with D.C. voltage from a suitable source, such as a battery or a rectifier (not shown), through leads L1 and L2, one lead of which is to the movable switch element 71 of the stepping switch SS4, for supplying current to the common connectors 60 of the respective cards 61, through the contacts 59' and 59, according to the fixed contact of the stepping switch with which the switch member 71 is engaged. The other D.C. lead is to a line 73 common to all of the main circuit lines 24" to 1" inclusive. Each main circuit line between its fixed circuit contacts and the common line 73 contains a relay controlling a switch controlling an associated resistor, to cut it in and out of established circuits, as will be explained. It is an important feature of the invention that although the main circuit lines are controlled by any respective stage organization of any plurality of the latter, there is the same single bank of relays and single bank of associated controlled resistors, establishing the potentiometer simulation for every stage.

Each relay switch, in the deenergized condition of the relay, which is the normal condition thereof, rests on a first contact "a." When any instant relay is energized, the switch moves from contact "a" and rests on a second contact "b."

All of the switch contacts "a," except the last, in both the left and right groups of relays, resistors and main circuits, connect to the movable switch member of the next adjacent relay. However, the right hand main circuit relay of the left side groups has its contact "a" connected to terminal C, while the extreme right side circuit relay of the right hand group has its contact "a" connected to terminal A. Finally, the extreme left circuit relay of the left side group has its switch connected to terminal B.

It will be seen that with all main circuit relays deenergized and with all relay switches on contacts "a" (which is the normal situation in the network in the absence of a card in a given stage and the energization of such stage by stepping switch SS4), a series circuit exists from terminal B, through all relay switches, to terminal C, without any interpolated resistors, and another series circuit exists from terminal C, through the relay switches, to terminal A, without any interpolated resistances. Each relay has associated with it a resistor 75, of predetermined ohmic value, and contacts "b" of each relay connect from the relay switch through the instant resistor to the respective series circuit with which it is associated (A–C or C–B). Therefore the energizaion of any given relay moves its switch member from contact "a" to contact "b" so as to place the given resistance of its associated resistor in series in the particular series circuit of the two just described.

The respective main circuit contacts on the inverted printed circuit card, as has been explained, are identified by numerals 24 to 1, respectively. The fixed contacts in the network to be engaged by the respective card contacts are identified as from 24' to 1'. The main circuits leading to the relays are identified as 24" to 1". For simplicity the respective relays and their switch members are identified collectively as 24CR to 1CR respectively. The respective resistors 75, associated with the respective relays have the following illustrative values: with relays 24CR and 12CR, 80 ohms, with relays 23CR and 11CR, 60 ohms, with relays 22CR and 10CR, 40 ohms, with relays 21CR and 9CR, 20 ohms, with relays 20CR and 8CR, 8 ohms, with relays 19CR and 7CR, 6 ohms, with relays 18CR and 6CR, 4 ohms, with relays 17CR and 5CR, 2 ohms, with relays 16CR and 4CR, .8 ohm, with relays 15CR and 3CR, .6 ohm, with relays 14CR and 2CR, .4 ohm, and with relays 13CR and 1CR, .2 ohm.

It will be observed that with the various resistors provided it is possible to effect series combinations of resistances of from 200 ohms down to .2 ohm, by decrements of .2 ohm, on both sides of the network. Thus the value of resistance across terminals B–C, and across terminals C–A, can be complementally established.

In coding the printed circuit cards it is only necessary to understand and appreciate the number of dial-scale divisions between the instantaneous datum and the desired cutoff point, to establish a resistance C–A proportional thereto. In its simplest essence it is, according to the illustrative situation the multiplication of the number of graduations by .2 ohm.

Considering the printed circuit card 61 of stage ingredient or step T, at the top of the diagrammatic FIG. 2 (of which only the electrical conductors are diagrammatically disclosed), which for illustrative purposes may be supposed to have the same format or the same coupling between contacts and the common connector, as the card of FIG. 3, let it be assumed that the number of graduations on the illustrative dial scale is 1000, as full scale is 1000 pounds, and that it is desired to deposit 130 pounds of the first ingredient on the scale. Relatedly it may be desired to have a work-step progress through 130 units of movement of the movable element in a machine tool control assembly. Assuming the illustrative scale, for purposes of explanation, it is desired to set the control so as to start with a given datum scale setting (in the case of the first ingredient usually a zero scale setting—in the case of a second ingredient it may be a datum established by the existing weight of the first ingredient such as the illustrative 130 pounds). From the instant datum it desired to apply 130 pounds on the scale, at which point the supply of the ingredient is to be cutoff. Whatever the datum scale setting then the amount of scale head motion controlling the signalling differential transformer in the control system must continue from the instant datum until the 130 pounds are applied to the scale, at which point the preset unbalance of the ultimate circuit will be balanced to actuate the control relay and effect cutoff of the ingredient supply. In the instant case therefore, as the left side of the card (as shown in FIG. 3) is to control the right side of the diagram of FIG. 2, reference is made to the chart associated or to be associated with the respective contacts 64', and it is found that 130 pounds involves the numeral 1, of the hundreds (H) digits, and the 3 of the Tens (T) digits. Jumpers, 63' or 63 according to either FIGS. 3 or 4, are therefore provided between card contacts 9 and 7 with common line 60 to establish the desired ultimate resistance in circuit A–C, as will be explained. It being desired to attain scale movement from datum to 130 pounds at cut-off, it will be seen as a corollary that the graduations from cut-off to full scale (of the illustrative 1000 pounds scale) will be 870 graduations representing 870 pounds. Referring to the right side of the card in FIG. 3, it will be seen, from the aligned chart, that 800 of the 870 is required in the hundreds digits 4, 3 and 1 (totalling 8, or 800 of the 870), and therefore jumpers are provided for contacts 24, 23 and 21. Of the 870 digits, 70, in the tens digits, required both 4 and 3, to total 7 tens digits, and jumpers are therefor provided for contacts 20 and 19, in order ultimately to set up the desired series resistance in the circuit C–B.

It will be seen that with the illustrative card as just described in its coding, after its inversion and insertion into stage T of the network, and with the stepping switch member 71 moved to the first contact "T" of the stepping switch SS4, so that the common line 60 of the card, through contacts 59 and 59', communicates with one lead of the D.C. voltage, by reason of the preselected bridging between the common line and the selected conacts the main circuits 9", 7" will be made through the respective relays 9CR and 7CR, the actuation of which places a resistance of 20 ohms and a resistance of 6 ohms or a total of 26 ohms in series in the circuit C–A. This total resistance of 26 ohms in the circuit A–C, with reference to a simulated potentiometer of a total resistance of 200 ohms, requires a complemental resistance of 174 ohms in the circuit B–C. As the card has been so organized and coded as mentioned the circuit is closed on the left side of the diagram through main circuits, 24", 23", 21", 20", and 19". The actuation of the respective relays 24CR, 23CR, 21CR, 20CR, and 19CR, energized by the recited main circuits thus places in series in circuit B–C 80 ohms, 60 ohms, 20 ohms, 8 ohms and 6 ohms, or a total resistance of 174 ohms.

In the coding of the cards for the other stages, as indicated in the diagram of FIG. 2, it will be seen that from datum to cutoff, for purely illustrative instance, main circuits are respectively closed so that the circuit C–A has total resistances of 55 ohms for stage U, 80 ohms for stage V, 125 ohms for stage W, 140 ohms for stage X, 167 ohms for stage Y, and 197 ohms for stage Z. It will also be seen that the circuit B–C has respective complemental resistances at each said stage.

Figure 5:
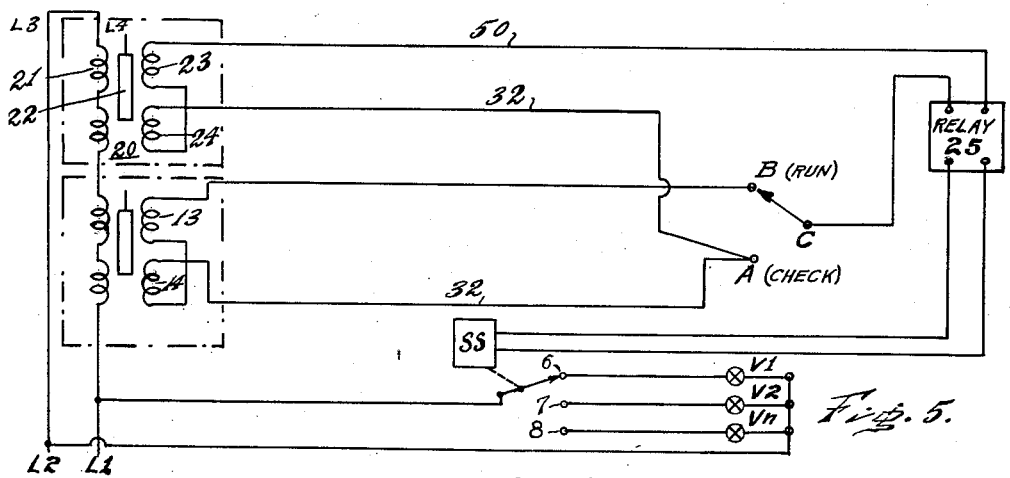
FIG. 5 represents schematically the wiring diagram of complemental components connected to the resistance circuit leads A, B and C of FIG. 2, to establish the simulation of the illustrative circuit of FIG. 1, in association with any one given potentiometer simulation.

To complete the circuitry of which the network of FIG. 2 and the cards of FIGS. 3 and 4 are part, a modification of the FIG. 1 disclosure may be made as indicated in FIG. 5. By this modification the same components are used as in FIG. 1, except that the terminals A–B–C replace all of the potentiometers of that figure. Let it be assumed for continued illustrative instance that the use of the invention is in batching by weight. Therefore the signalling differential transformer 20 has its armature 22 coupled for linear movement in response to angular motion of an element in the scale head, which latter is angularly moved proportionally to weight on the associated scale. For such an organization reference may be made to the U.S. application of Charles E. Roessler, Jr., Serial No. 650,469, filed April 3, 1957, entitled Transmitters, and now Patent No. 2,885,198.

Let it be assumed that the stages T to Z inclusive each measure one ingredient of a total batch formula, the weights of the respective ingredients are predetermined and incorporated in a given related series of printed cards pertaining to that formula. In the maximum number of ingredients of the formula this means the preparation and storage of seven related printed cards. For variations in the relative proportions according to another formula, another group of seven cards will be coded and considered as a related group. There is no limit to the number of formulas which may thus be prepared and stored in small, compact, inexpensive and highly efficient groups.

Let it be assumed that a selected batching formula is comprised of the seven respective printed cards ultimately associated with the network of FIG. 2, in the respective stages thereof, comprising seven ingredients. At the start, there are no cards in the network, there is no weight on the scale and therefor the armature 22 of the signalling transformer is in a mid position at which the output of the secondary winding 23 and 24 is substantially null, the range coil has been adjusted so that a voltage arises in the secondary winding 13 and 14 of the range coil, all of the main circuits and therefore the relays are deenergized, there is no valve open to supply any ingredient to the scale, and the D.C. circuit is open, either by a supplemental switch in the line, or by moving the switch 71 of the stepping switch to rest on a dead contact.

The operator having selected the desired group just described, from the groups in storage, then successively feeds the cards into the respective stages "T" to "Z." The stepping switch 71 is then moved to contact "T," or the D.C. circuit therethrough is closed, energizing the first stage or ingredient only, of the series of stages. In synchronism with the closing of the circuit through switch 71, the card contacts effect the closing of the selected main circuits, the relays of which cut the selected resistances into the circuits establishing resistances A–C and C–B, simulative of a potentiometer, and an unbalance exists in the circuit. The unbalance actuates the relay 25 in one sense and opens valve V1, which starts the supply of the first ingredient to the scale. In the illustrative case when 130 pounds has been delivered to the scale the armature 22 has been moved to effect an output from the secondary winding which balances the circuit and establishes a new datum for the second ingredient. This again actuates relay 25 to shut off valve V1, and open valve V2 to supply the next ingredient to the scale, the stepping switch 71 moves from contact "T" and moves to "U," and starts the next cycle or stage, and so on through as many ingredients as the network is set up for.

It will be apparent that but a single bank of the resistances 75 needs be provided, to effect successively any number of combinations of resistances in the control system, according to the number of stages involved, in contrast to the previous necessity of providing that same number of potentiometers with their multiple connectors. The result of the invention is a highly compact, economical circuit susceptible to selective operation by an infinite number of small economical printed circuit cards.

While it will be understood that any desired disposition of the terminals A, B, and C, can be used to couple them into the transmitter circuit of FIG. 5, it is presently preferred that terminal C be a common switch connection movable to close a circuit with B for "running" and movable from B, whenever desired, to close a circuit with A, for "checking."

It will be apparent that the card disclosed is, broadly, illustrative and not limitative. It may have any profile or plan form, other than rectangular, and does not need to be of uniform thickness, within the broad purview of the invention.

It will also be apparent that many modifications may be made in the invention without departing from the spirit thereof. For instance, although it is presently preferred to utilize individual printed circuits each preset for a given formula or organization, many users of the devices may have card controlled computing devices or the like, by punched cards of which selected operations or computations can be effected. In an illustrative type of control conducting brushes or fingers or the like pass through apertures in the punched cards to complete a circuit through a conductor. It will be understood that applicant may provide a plurality of printed cards in which the contacts are all separated from the common return, and by punched cards, predetermined in relation to the printed cards, selected circuits can be established between the contacts and the common return for related functions to those previously set forth in the system.

Many other modifications and changes can be made in the system without departing from the spirit of the invention and all such are to be construed as within the scope of the invention unless otherwise excluded by express limitations in the appended claims.

I claim as my invention:

1. A control system comprising a network, a first set of plural relatively fixed contacts in said network, a second set of plural relatively fixed contacts in said network respectively related to the respective contacts in said first set, a line common to each pair of related contacts of said first and second sets to establish a plurality of incomplete main circuits, relays in each main circuit and each controlling a switch, said network establishing a series circuit including said switches, a resistor associated with each relay and controlled by its switch to insert the resistor in said series circuit when the instant relay is actuated, a first printed circuit card having plural contacts engageable respectively with said first set of plural relatively fixed contacts, and having a common conductor, selected contacts on said card in conducting relation to said common conductor, a second printed circuit card having plural contacts engageable respectively with said second set of plural relatively fixed contacts and having a common conductor, selected contacts on said second card in conducting relation to its said common conductor, a power conductor common to all of said main circuits on one side of the respective relays, a power conductor for the common conductor of said first card to energize the selected main circuits, and means for disconnecting said last mentioned power conductor from the common conductor of said first card to deenergize said first selected main circuits and for connecting said last mentioned power conductor to said common conductor of said second card to energize selected main circuits.

2. A control system as in claim 1, in which the power conductors are of D.C. current, and each connection between related contacts and the respective incomplete main circuits is across a diode.

3. A control system comprising a network including effective terminals B, C and A, said network including a plurality of normally incomplete main circuits each including a contact element and a relay switch means respectively associated with and controlled by said respective relays and forming elements in series circuits between B and C and between C and A, a resistor associated with each relay and its switch means and controlled by the latter whereby upon completion of any of said respective main circuits its associated resistor is inserted into the series circuit of which the associated switch means is an element, and means for completing predeterminedly selected main circuits.

4. A control system as in claim 3, in which the means for completing comprises connections for a power source, a lead from said power source common to all of said main circuits, a printed circuit card comprising contacts and a common conductor, means connecting certain of said contacts to said common conductor, means for connecting said certain of said contacts into circuit relation respectively with some of said main circuits, and means for connecting said other lead from said power source to said common connector of said card.

5. A control system, for establishing in succession a pluratliy of selected voltage dividers in a common voltage divider circuit, comprising in combination, a plurality of relays each controlling the introduction of a fixed impedance into the voltage divider circuit, a stepping switch having a movable contactor successively connectable to each of a plurality of fixed contacts, means connecting each relay to the movable contactor of said stepping switch, each fixed contact of said stepping switch selectively connectable with each of said relays and a source of power in series circuit with said connected relays, and precoded means for connecting each of said fixed contacts of said stepping switch to selected relays, whereby selected voltage dividers may be established in succession as said stepping switch operates.

6. The control system defined in claim 5 in which each of said relays operates a switch member having two positions, one position of said member introducing the corresponding impedance into the voltage divider circuit, the other position of said member removing said impedance from the voltage divider circuit.

7. The control system of claim 6 in which the impedances introduced into the voltage divider circuit are in series with each other.

8. The control system of claim 5 including a first plurality of contacts each connected to one of said relays and a second plurality of contacts each connected to one of said fixed contacts of said stepping switch.

9. The control system of claim 8 including a plurality of groups of precoded means, each of said means in a group adapted to connect one of said second plurality of contacts to a selected group of said first plurality of contacts.

10. The control system defined in claim 9 in which each of said precoded means in a group of precoded means is adapted to produce the same total series impedance in said voltage divider circuit.

11. The control system of claim 9 in which each of said precoded means comprises an interchangeable member having a circuit therein including a shunt conductor connectable to said one of said second plurality of contacts and a plurality of conductors each connectable to one of said first plurality of contacts such that a one to one correspondence is established between said plurality of conductors and said relays, and selected conductors between said shunt and said plurality of conductors.

12. A matrix circuit adapted to simulate, in succession, the voltage dividing characteristics of an incrementably variable potentiometer having a movable tap which takes in succession, a series of positions between opposite end terminals of a fixed resistance comprising, in combination; two identical matrixes, each comprising, a plurality of relays, each relay adapted to connect one of an equal number of fixed resistors in series into one end to tap portion of said simulated potentiometer, said relays connected together at a common one of their control terminals; a plurality of row conductors, a plurality of column conductors, each of said column conductors connected to one of said relays at the other control terminals of said relays; a stepping switch having a movable contactor and a plurality of fixed poles, the fixed poles of said stepping switch each connected to one of said row conductors, the movable contactor of said stepping switch connected in series with said common control terminals of said relays, a voltage source connected in series between said stepping switch and said relays; and each of said row conductors connectable with each of said column conductors, whereby said rows may be preconnected to said columns to establish preselected total complimentary series resistances in each matrix group of said resistances at each position of said movable contactor of said stepping switch, thereby simulating a potentiometer having a series of tap positions corresponding to each position of said movable contactor of said stepping switch.

13. The circuit defined in claim 12 in which each of said row conductors terminates in a connector, each of said column conductors is connected to a plurality of connectors each aligned with one of said row connectors, and a plurality of precoded means each connectable to one of said row connectors and simultaneously to the correspondingly aligned column connectors, said precoded means having preselected conducting paths between selected column connectors and said one connected row connector to cause the matrix circuit to simulate a particular tap position of the simulated potentiometer when said movable contactor of said stepping switch is in conductive engagement with the fixed pole of said stepping switch which is connected to said one connected row conductor.

14. A control system including a circuit according to claim 13 and first and second identical transducers, said first transducer adapted to produce a reference voltage, said second transducer adapted to produce a voltage proportional to a variable controlled by the control system, a plurality of output circuits equal in number to the number of row conductors in said matrixes, means simultaneously operable with said stepping switch to energize one of said output circuits at each position of said movable contactor of said stepping switch, the voltage produced by said first transducer being applied to said end terminals of the simulated potentiometer the voltage thereby appearing between one of said end terminals and the tap of said potentiometer being added to the voltage produced by said second transducer, and a null actuated relay to which the voltage resultant of said addition is applied as the control thereof, said null actuated relay adapted to cause said stepping switch to step whenever said resultant voltage is null.

15. A control system comprising a voltage divider circuit, an electrical power source having two terminals, conductor means providing a plurality of electrically independent current paths, a plurality of discrete independent resistors, a plurality of relays each having first and second terminals and being energizable to introduce said resistors serially into said divider circuit, the first terminal of each relay being connected to one terminal of said power source, precoded means connecting preselected ones of said second relay terminals to said current paths and switching means actuatable to successively connect said current paths to the other terminal of said power source for energizing the ones of said relays connected to said current paths.

References Cited in the file of this patent

UNITED STATES PATENTS

| | | |
|---|---|---|
| 1,396,552 | Bossu | Nov. 8, 1921 |
| 1,596,704 | Yerger | Aug. 17, 1926 |
| 2,431,058 | Manning | Nov. 18, 1947 |
| 2,573,405 | Clark | Oct. 30, 1951 |
| 2,656,109 | Lindars | Oct. 20, 1953 |
| 2,693,584 | Pifer | Nov. 2, 1954 |
| 2,707,272 | Blitz | Apr. 26, 1955 |
| 2,715,703 | Schuck | Aug. 16, 1955 |
| 2,801,819 | Lindars | Aug. 6, 1957 |
| 2,801,874 | Macgeorge | Aug. 6, 1957 |
| 2,813,987 | Taylor | Nov. 19, 1957 |
| 2,892,147 | Bell | June 23, 1959 |
| 2,976,468 | Rouse | Mar. 21, 1961 |
| 2,999,202 | Ule | Sept. 5, 1961 |
| 3,044,007 | Akers | July 10, 1962 |